(12) United States Patent
Saeger et al.

(10) Patent No.: US 10,179,495 B2
(45) Date of Patent: Jan. 15, 2019

(54) SYSTEM AND METHOD FOR ADJUSTING A MOTOR VEHICLE CHASSIS

(71) Applicant: Ford Global Technologies, LLC, Dearborn, MI (US)

(72) Inventors: Martin Saeger, Pulheim (DE); Simon Baales, Cologne (DE); Michael Seemann, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,767

(22) Filed: Jan. 20, 2017

(65) Prior Publication Data

US 2017/0210193 A1 Jul. 27, 2017

(30) Foreign Application Priority Data

Jan. 22, 2016 (DE) .................. 10 2016 200 926

(51) Int. Cl.
*B60G 21/00* (2006.01)
*B60G 11/26* (2006.01)

(52) U.S. Cl.
CPC ............ *B60G 21/005* (2013.01); *B60G 11/26* (2013.01); *B60G 2300/044* (2013.01); *B60G 2400/104* (2013.01); *B60G 2401/14* (2013.01); *B60G 2800/9122* (2013.01)

(58) Field of Classification Search
CPC .................. B60G 21/005; B60G 11/26; B60G 2800/9122; B60G 2401/14; B60G 2300/044; B60G 2400/104; B60W 10/22; B60W 30/02; B60W 30/18172; B60W 30/045; B60K 23/04; B60K 2023/046; B60K 2023/043; B60Y 2300/18108; B60Y 2300/28

See application file for complete search history.

(56) References Cited

U.S. PATENT DOCUMENTS

| 6,523,911 | B1 * | 2/2003 | Rupp | .................. B60T 7/20 188/112 A |
| 7,401,871 | B2 | 7/2008 | Lu et al. | |
| 7,640,081 | B2 | 12/2009 | Lu et al. | |
| 7,896,360 | B2 * | 3/2011 | Buma | ................ B60G 17/0161 280/5.502 |
| 8,010,252 | B2 * | 8/2011 | Getman | ................ B60T 8/1755 280/432 |
| 8,046,147 | B2 * | 10/2011 | Waldbauer | ............ B60T 8/1708 188/180 |
| 9,061,663 | B2 | 6/2015 | Wu | |

(Continued)

FOREIGN PATENT DOCUMENTS

| DE | 102004040876 A1 | 12/2005 |
| DE | 102006052698 A1 | 5/2007 |

(Continued)

*Primary Examiner* — Darlene P Condra
(74) *Attorney, Agent, or Firm* — Raymond L. Coppiellie; Burgess Law Office, PLLC

(57) ABSTRACT

An adjustment system and method for adjusting a chassis property of a motor vehicle wherein an understeering sensitivity of the motor vehicle is increased upon detecting that a trailer has been coupled to the motor vehicle. A detection unit operates to detect when a trailer is attached or coupled to the motor vehicle.

12 Claims, 3 Drawing Sheets

(56) References Cited

U.S. PATENT DOCUMENTS

| | | | | |
|---|---|---|---|---|
| 2002/0095251 A1* | 7/2002 | Oh | ............................ | B60T 7/20 |
| | | | | 701/70 |
| 2005/0236894 A1* | 10/2005 | Lu | .......................... | B60T 8/1755 |
| | | | | 303/139 |
| 2006/0206253 A1* | 9/2006 | Yu | .......................... | B62D 6/002 |
| | | | | 701/70 |
| 2007/0260386 A1* | 11/2007 | Tandy, Jr. | .............. | B60T 8/1708 |
| | | | | 701/70 |
| 2008/0007023 A1* | 1/2008 | Anderten | ............. | B60G 17/015 |
| | | | | 280/124.106 |
| 2014/0350818 A1* | 11/2014 | Obermuller | ............. | B60T 8/172 |
| | | | | 701/74 |
| 2015/0165850 A1* | 6/2015 | Chiu | ......................... | B60D 1/62 |
| | | | | 701/41 |
| 2015/0224845 A1* | 8/2015 | Anderson | ............ | B60G 17/019 |
| | | | | 701/37 |
| 2015/0224989 A1* | 8/2015 | Fairgrieve | ........... | B60W 50/082 |
| | | | | 701/37 |
| 2017/0305436 A1* | 10/2017 | Maskell | ................. | B60W 40/11 |

FOREIGN PATENT DOCUMENTS

| | | |
|---|---|---|
| DE | 102006054703 A1 | 1/2008 |
| DE | 102009022302 A1 | 11/2010 |
| EP | 2013043 B1 | 5/2010 |

\* cited by examiner

SYSTEM AND METHOD FOR ADJUSTING A MOTOR VEHICLE CHASSIS

CROSS-REFERENCE TO RELATED APPLICATIONS

Not Applicable

BACKGROUND OF THE INVENTION

1. Field of the Invention

The present invention relates to a system and method for operating a motor vehicle and more specifically to adjusting a chassis property of a motor vehicle pulling a trailer.

2. Description of Related Art

Roll control systems are used in motor vehicles to counteract a rolling motion, also referred to as rolling, of the motor vehicle when an irregularity in the road or a cornering maneuver results in compression or rebound of a single wheel of an axle. The roll control system transfers the movement of the vehicle body, generated by the springing, to the other side of the vehicle. A torsion property of the roll control system induces a damping and a delay of the transfer and, therefore, induces a more favorable dynamic behavior. Roll control systems can be provided either on the front axle, the rear axle, or on both the front and rear axles of the motor vehicle.

Active stabilizers, within the scope of active roll control (ARC), are becoming increasingly widespread in motor vehicles having a high center of gravity, and in sport vehicles. Active roll control enables adapting the roll properties of the vehicle to different driving situations and personal preferences of the driver by changing the mechanical transfer properties of the stabilizer. For example, active roll control influences understeering behavior of the motor vehicle.

SUMMARY OF THE INVENTION

A method for adjusting a chassis property of a motor vehicle including the step of increasing an understeering sensitivity of the motor vehicle upon detecting that a trailer has been coupled to the motor vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
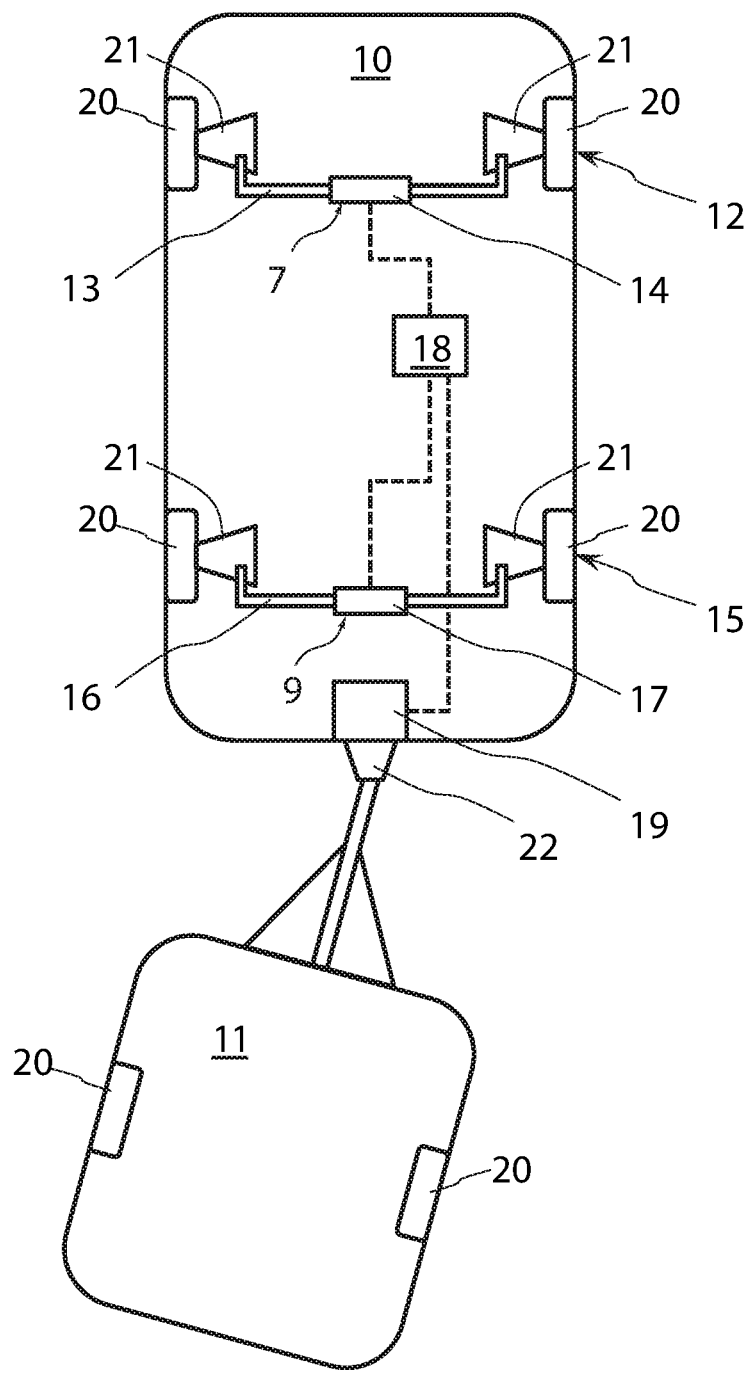
FIG. 1 is a schematic, block diagram of a motor vehicle and trailer according to a first exemplary embodiment of the invention.
Figure 2:
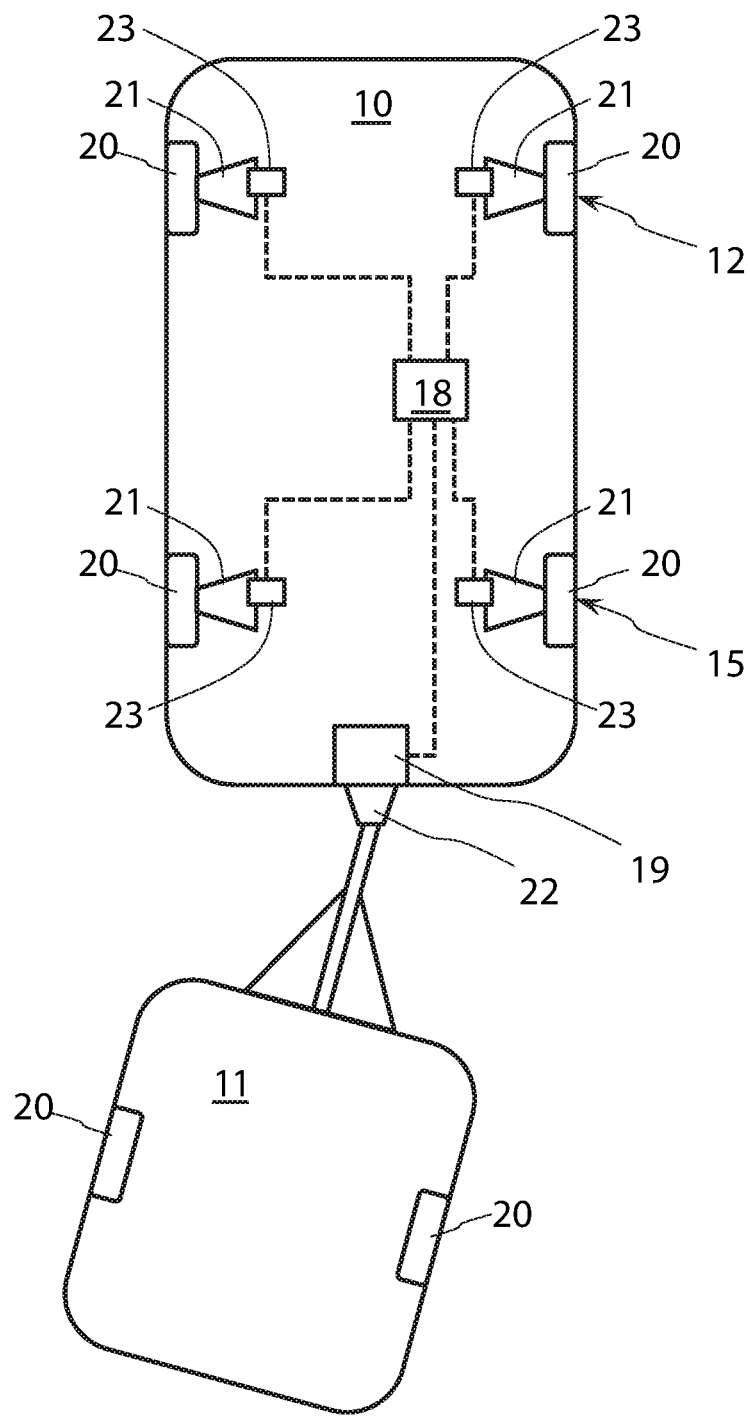
FIG. 2 is a schematic, block diagram of a motor vehicle according to a second exemplary embodiment of the invention.

FIGS. 1 and 2 show a motor vehicle 10 according to the invention in a first and second exemplary embodiment. A trailer 11 is coupled to the motor vehicle 10. A trailer hitch 22 attached to the motor vehicle 10 includes, in particular, a trailer coupling and a trailer socket.

As illustrated, the trailer 11 includes wheels. As used herein, the term 'trailer" should also include components, structures, or devices that can be mounted on the trailer hitch or rear of the vehicle and which do not have wheels of their own, for example bicycle carriers.

The motor vehicle 10 is a two-track motor vehicle 10 having a chassis including a front axle 12 and a rear axle 15. One wheel 20 is assigned to each axle 12, 15 on each side of the motor vehicle. The wheels 20 are each mounted on a wheel suspension 21. The chassis of the motor vehicle 10 permits a compression of the individual wheels 20.

FIG. 1 shows a first embodiment of the motor vehicle 10 having at least one roll control system, in the present example an adjustable chassis adjuster, seen generally at 7, 9 designed for influencing a roll behavior of the motor vehicle 10. FIG. 2 shows a second embodiment of the motor vehicle 10 having at least one roll control system, shown as an adjustable chassis adjuster, seen generally at 23, designed for influencing a roll behavior of the motor vehicle 10. As shown in FIG. 1 the chassis adjuster 7, 9 can be a stabilizer adjustment device, for example an active lateral stabilizer or as shown in FIG. 2 the chassis adjuster 23 can be a vertical chassis actuator, for example an active suspension actuator.

In the first embodiment, at least one axle 12, 15 of the motor vehicle 10 includes a chassis adjuster 7, 9 shown as an adjustable stabilizer 13, 16. The stabilizer 13, 16 is used for roll stabilization and transfers the movement of the vehicle body, generated by the springing on one side of the vehicle, to the opposite side of the vehicle. The stabilizer 13, 16 includes a stabilizer adjustment device 14, 17, to carry out adjustments. The stabilizer adjustment device 14, 17 is designed for varying the ways that the stabilizer 13, 16 transfers torque, by way of varying the torsional stiffness of the stabilizer 13, 16 and/or applying a defined torque to the stabilizer 13, 16. For example, the stabilizer adjustment device 14, 17 is a rotary actuator. In FIG. 1, the motor vehicle 10 includes, on its front axle 12, a front stabilizer 13 having a front stabilizer adjustment device 14 and, on its rear axle 15, a rear stabilizer 16 having a rear stabilizer adjustment device 17.

In the second embodiment, see FIG. 2, at least one axle 12, 15 of the motor vehicle 10 includes a vertical chassis actuator 23 for each wheel suspension 21. The vertical chassis actuators 23 are likewise uses for the roll stabilization of the motor vehicle 10 and are designed for adjusting wheel load differences between the right and the left wheels 20. In FIG. 2, the motor vehicle 10 includes a vertical chassis actuator for each wheel 20 on the front axle 12 and a chassis actuator 23 for each wheel on the rear axle 15.

The motor vehicle 10 also includes a control unit or controller 18 designed for controlling the at least one chassis adjuster 14, 17, 23.

The motor vehicle 10 also includes a detection unit or detector 19 operating to detect whether a trailer 11 is attached to the motor vehicle 10. The detection unit 19 can be designed for detecting an attached trailer 11, for example, based on contact information generated by a contact switch positioned between the trailer hitch 22 and the trailer 11. Detection may also be based on information regarding handling the vehicle. In this way, contact information could arise due to the trailer hitch 22 being utilized. Information regarding the handling could be a yaw behavior and/or a lateral acceleration behavior in relation to steering commands from the driver. Other detectors or detection mechanisms such as cameras and proximity sensors could also be used. The detection unit 19 generates a signal based on the presence of a trailer, supplies the signal to, and can be integrated into the control unit 18.

Figure 3:
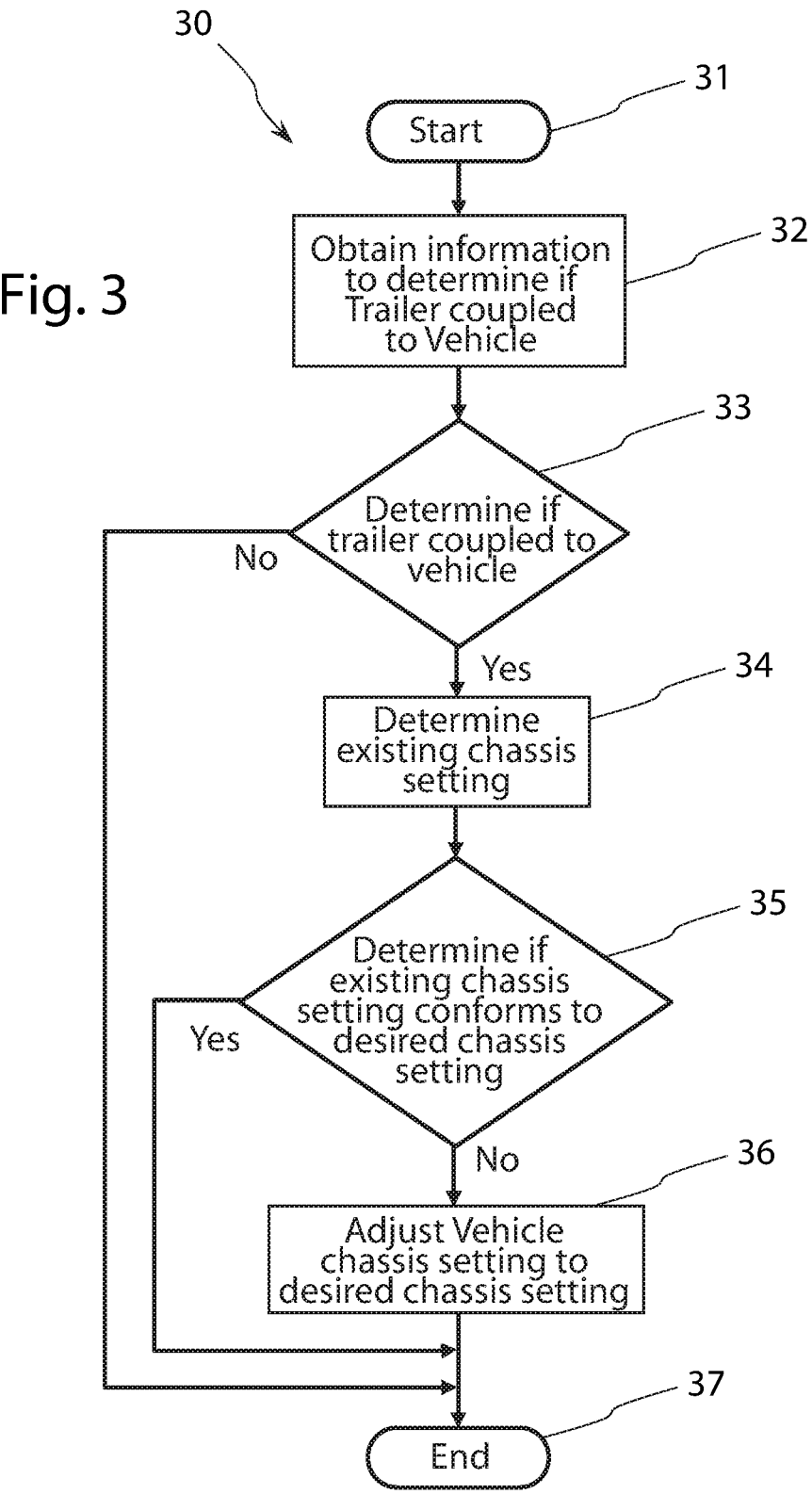
FIG. 3 is a flowchart of a schematic sequence of an exemplary embodiment of the method according to the invention.

FIG. 3 shows a flowchart of the adjustment method 30 from a start 31 to an end 37. The motor vehicle 10 according to the invention is designed for carrying out the adjustment method 30.

In the adjustment method 30 according to the invention, upon detecting that a trailer 11 has been coupled to the motor vehicle 10, the motor vehicle 10 is adjusted to have greater understeering than when a trailer 11 has not been coupled to the motor vehicle 10. The motor vehicle 10 is brought from a current setting into a desired setting such as trailer mode. In the desired setting or trailer mode, the motor vehicle preferably has an understeering characteristic. In the motor vehicle 10, an understeer gradient is also increased; in particular, an understeer gradient is generated, which is greater than zero.

For this purpose, in step 32 the method according to one example thereof ascertains or obtains at least one piece of information for determining whether a trailer 11 is coupled to the motor vehicle 10. The piece of information is, for example, a piece of contact information, sensor information, a value for a lateral acceleration or a value for a yaw rate of the motor vehicle 10.

The method, in step 33, carries out a comparison 33, to evaluate the information and determine if the trailer 11 is coupled to the vehicle 10. In this step, the information obtained in step 32 is compared to known, stored information.

In step 34, the method determines the existing chassis setting.

In step 35, the method determines if the existing chassis setting conforms to or is the desired chassis setting. If so, the method moves to step 37 and ends.

In step 36, the method adjusts the vehicle chassis setting to the desired chassis setting based on a determination that a trailer 11 is currently coupled to the motor vehicle 10. At least one chassis adjuster 7, 9, 23 is adjusted and the chassis of the motor vehicle 10 is brought into a desired setting, in which the motor vehicle 10 has a greater tendency toward understeering than in a previously set normal setting without a trailer 11. For this purpose, the roll stability is adjusted at least for one axle 12, 15 of the motor vehicle 10. In this way, a roll stability of the front axle 12 of the motor vehicle 10 can be increased and/or a roll stability of the rear axle 15 of the motor vehicle 10 can be reduced.

To increase the roll stability of the front axle 12, the front stabilizer 13 assigned to the front axle 12 can be set to have greater torsional stiffness. The stabilizer rate at the front axle is thereby increased. Alternatively, the vertical chassis actuators 23 on the front axle 12 can be adjusted to increase the wheel load differences between the right and the left wheels 20.

To decrease the roll stability of the rear axle 15, the rear stabilizer 16 assigned to the rear axle 15 can be set to have less torsional stiffness. The stabilizer rate at the rear axle is thereby decreased. Preferably, the front axle 12 is set to have greater roll stability than the rear axle 15. Alternatively, the vertical chassis actuators 23 on the rear axle 15 can be adjusted decrease the wheel load differences between the right and the left wheels 20.

According to one embodiment of the method according to the invention, an understeering sensitivity of the motor vehicle is increased upon determining that a trailer has been coupled to the motor vehicle. The chassis design can be advantageously adapted to the situation to achieve increased handling of the motor vehicle in the trailer mode.

In one embodiment of the method according to the invention, a front axle of the motor vehicle is adjusted to be more roll-stabilized than a rear axle of the motor vehicle. As a result, the understeering readiness of the motor vehicle is increased in a simple way.

In a further embodiment of method according to the invention, a front stabilizer assigned to the front axle is adjusted to have greater torsional stiffness. Additionally or alternatively, a rear stabilizer assigned to the rear axle is adjusted to have less torsional stiffness. As a result, an active stabilizer on the front axle and/or on the rear axle, which are/is already utilized in motor vehicles, can be utilized for the adjustment.

In a further embodiment of the method according to the invention, vertical chassis actuators, rather than the stabilizers, are adjusted. In this way, two vertical chassis actuators assigned to the front axle are adjusted to increase wheel load differences between the right wheel and the left wheel. Alternatively or additionally, two vertical chassis actuators assigned to the rear axle are adjusted for decreasing wheel load differences between the right wheel and the left wheel. As a result, vertical chassis actuators, which are already utilized in motor vehicles, can be utilized for the adjustment.

As set forth above, coupling of the trailer to the motor vehicle may be determined based on contact information. For example, an actuator or contact switch provides information regarding connection to the trailer socket.

In addition, coupling of the trailer to the motor vehicle may be determined based on information relating to handling of the motor vehicle. It is possible to utilize information collected from or for other vehicle systems, for this purpose as well. Even a trailer, coupled in an unintended manner, can therefore be detected, as is also the case for a bicycle carrier, or any other devices mounted onto the rear of the vehicle, that affect the driving characteristics.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for adjusting a chassis property of a motor vehicle comprising:
   a front axle;
   a rear axle;
   an adjustable chassis adjuster associated with one of the front axle and rear axle effective to increase vehicle understeer;
   a detector; and
   a controller connected to and adjusting said adjustable chassis adjuster based on a trailer attached signal from said detector.

2. The system of claim 1 wherein said adjustable chassis adjuster includes a lateral stabilizer member.

3. The system of claim 1 wherein said adjustable chassis adjuster includes an active lateral stabilizer member having an actuator.

4. The system of claim 1 wherein said adjustable chassis adjuster includes a vertical chassis actuator.

5. The system of claim 1 wherein said adjustable chassis adjuster includes an air spring.

6. The system of claim 1 wherein said detector includes a contact detector positioned between a trailer hitch on the vehicle and a trailer.

7. The system of claim 1 wherein said detector is a yaw or lateral acceleration sensor.

8. The system of claim 1 wherein said detector is a camera.

9. The system of claim 1 wherein said detector is a proximity sensor.

10. A system for adjusting a motor vehicle comprising:
   a front axle;
   a rear axle;
   an adjustable chassis adjuster associated with one of the front axle and rear axle;
   a detector generating a trailer attached signal; and
   a controller receiving said trailer attached signal and signaling said adjustable chassis adjuster to increase an understeer of the motor vehicle when said trailer attached signal is received.

11. The system of claim 10 wherein the system increases the vehicle understeer characteristic by increasing roll stability of a front axle.

12. The system of claim 10 wherein the system increases the vehicle understeer characteristic by reducing roll stability of the rear axle.

* * * * *